(12) United States Patent
Butler, III

(10) Patent No.: US 10,056,017 B2
(45) Date of Patent: Aug. 21, 2018

(54) FLAG MOUNT BRACKET SYSTEMS

(71) Applicant: George H. Butler, III, Mesa, AZ (US)

(72) Inventor: George H. Butler, III, Mesa, AZ (US)

(73) Assignee: GB3 Designs, Mesa, AZ (US)

(*) Notice: Subject to any disclaimer, the term of this patent is extended or adjusted under 35 U.S.C. 154(b) by 0 days.

(21) Appl. No.: 14/989,786

(22) Filed: Jan. 6, 2016

(65) Prior Publication Data

US 2017/0046989 A1    Feb. 16, 2017

Related U.S. Application Data

(60) Provisional application No. 62/100,399, filed on Jan. 6, 2015.

(51) Int. Cl.
*G09F 17/00* (2006.01)
*B25J 1/04* (2006.01)

(52) U.S. Cl.
CPC ............ *G09F 17/00* (2013.01); *B25J 1/04* (2013.01); *G09F 2017/0008* (2013.01); *G09F 2017/0025* (2013.01)

(58) Field of Classification Search
CPC ............ G09F 17/00; G09F 2017/0025; G09F 2017/005; G09F 2017/0058; G09F 2017/0066; G09F 2017/0075
USPC ......... 248/514, 518, 521, 534; 116/173, 116
See application file for complete search history.

(56) References Cited

U.S. PATENT DOCUMENTS

| | | | |
|---|---|---|---|
| 581,991 A * | 5/1897 | Homan ................... | B25B 5/102 24/514 |
| 1,339,833 A * | 5/1920 | Saltmarsh ............... | E04H 12/32 116/173 |
| 1,665,535 A | 11/1927 | Davis | |
| 1,742,481 A | 1/1930 | Miller | |
| 3,664,617 A * | 5/1972 | Fenwick ................. | A47F 11/02 248/314 |
| 3,792,680 A | 2/1974 | Allen | |
| 3,996,882 A | 12/1976 | Martin et al. | |
| 4,554,885 A | 11/1985 | Burny, Jr. | |
| 4,864,962 A | 9/1989 | Kuehl et al. | |
| 4,917,343 A * | 4/1990 | Wainscott .............. | A47B 23/06 248/284.1 |
| 5,042,418 A * | 8/1991 | Hoover ................. | B60R 13/005 116/173 |
| D340,676 S * | 10/1993 | Gallagher ..................... | D11/181 |
| 5,374,024 A * | 12/1994 | Williams .................. | G09F 7/18 116/173 |
| 5,572,836 A | 11/1996 | Parker | |
| 5,588,630 A * | 12/1996 | Chen-Chao ............. | F16C 11/10 248/514 |
| 6,050,020 A * | 4/2000 | Sizemore ............... | A01K 97/11 43/15 |
| 6,138,978 A | 10/2000 | Andersen | |
| 6,450,557 B1 * | 9/2002 | Martinez ................. | A47F 13/06 294/210 |
| 6,799,530 B1 | 10/2004 | Heichelbech | |
| 6,988,701 B1 * | 1/2006 | Lin ......................... | F16C 11/10 248/514 |

(Continued)

*Primary Examiner* — Muhammad Ijaz
(74) *Attorney, Agent, or Firm* — Lodestar Patents, PLLC; Raymond J. E. Hall

(57) ABSTRACT

Flag mount bracket system for improved installation of a flag into a bracket safely from ground level without the need for a ladder comprising a spring tension mount or ratchet mount and a specialized raising and lowering pole.

20 Claims, 11 Drawing Sheets

(56) References Cited

U.S. PATENT DOCUMENTS

| | | | | |
|---|---|---|---|---|
| 7,007,906 B2* | 3/2006 | Slatter | ............... | A01K 91/08 |
| | | | | 114/255 |
| 7,114,281 B2* | 10/2006 | Miller | ............... | A01K 97/10 |
| | | | | 43/21.2 |
| 7,293,745 B2* | 11/2007 | Catapano | ............ | F16L 3/222 |
| | | | | 248/61 |
| 8,439,316 B2* | 5/2013 | Feige | ............... | F16L 3/13 |
| | | | | 248/71 |
| 9,326,496 B2* | 5/2016 | Chmura | ............ | A01K 97/10 |
| 2001/0050327 A1* | 12/2001 | Sweere | ............ | F16C 11/045 |
| | | | | 248/292.14 |
| 2006/0102822 A1* | 5/2006 | Liang | ............... | F16C 11/10 |
| | | | | 248/514 |
| 2006/0102824 A1* | 5/2006 | Carnevali | ............ | F16C 11/10 |
| | | | | 248/534 |
| 2006/0130381 A1 | 6/2006 | Caterinacci | | |
| 2009/0294602 A1* | 12/2009 | Korczak | ............ | F16L 3/127 |
| | | | | 248/74.2 |
| 2011/0185960 A1* | 8/2011 | Priegel | ............... | G09F 17/00 |
| | | | | 116/173 |
| 2013/0061797 A1* | 3/2013 | Proctor | ............ | G09F 17/00 |
| | | | | 116/173 |

* cited by examiner

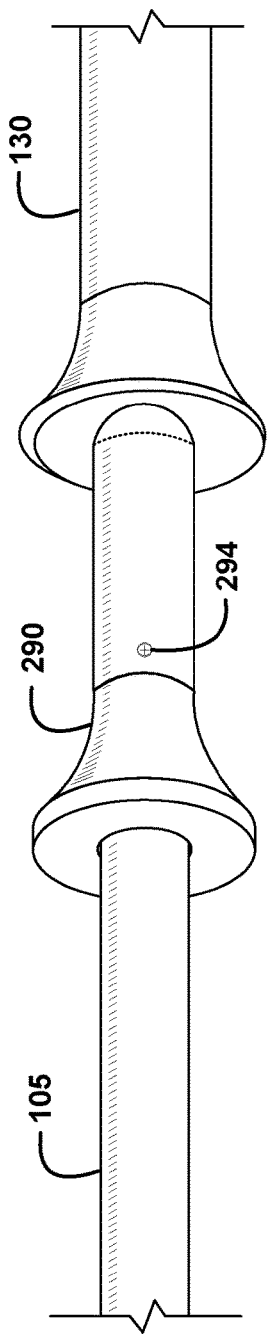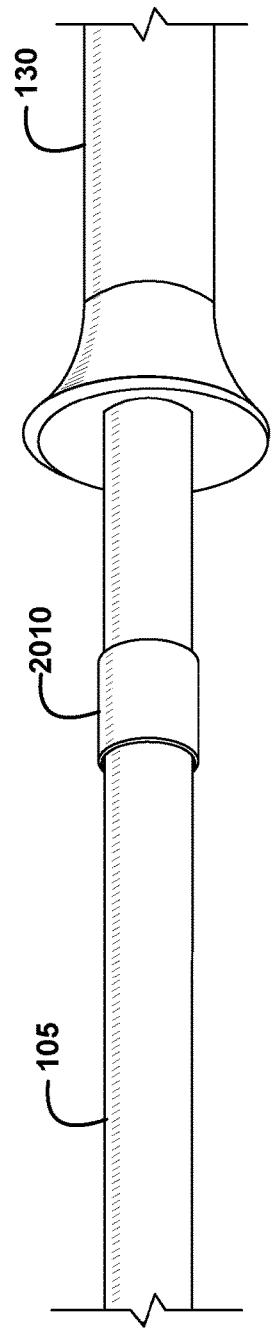

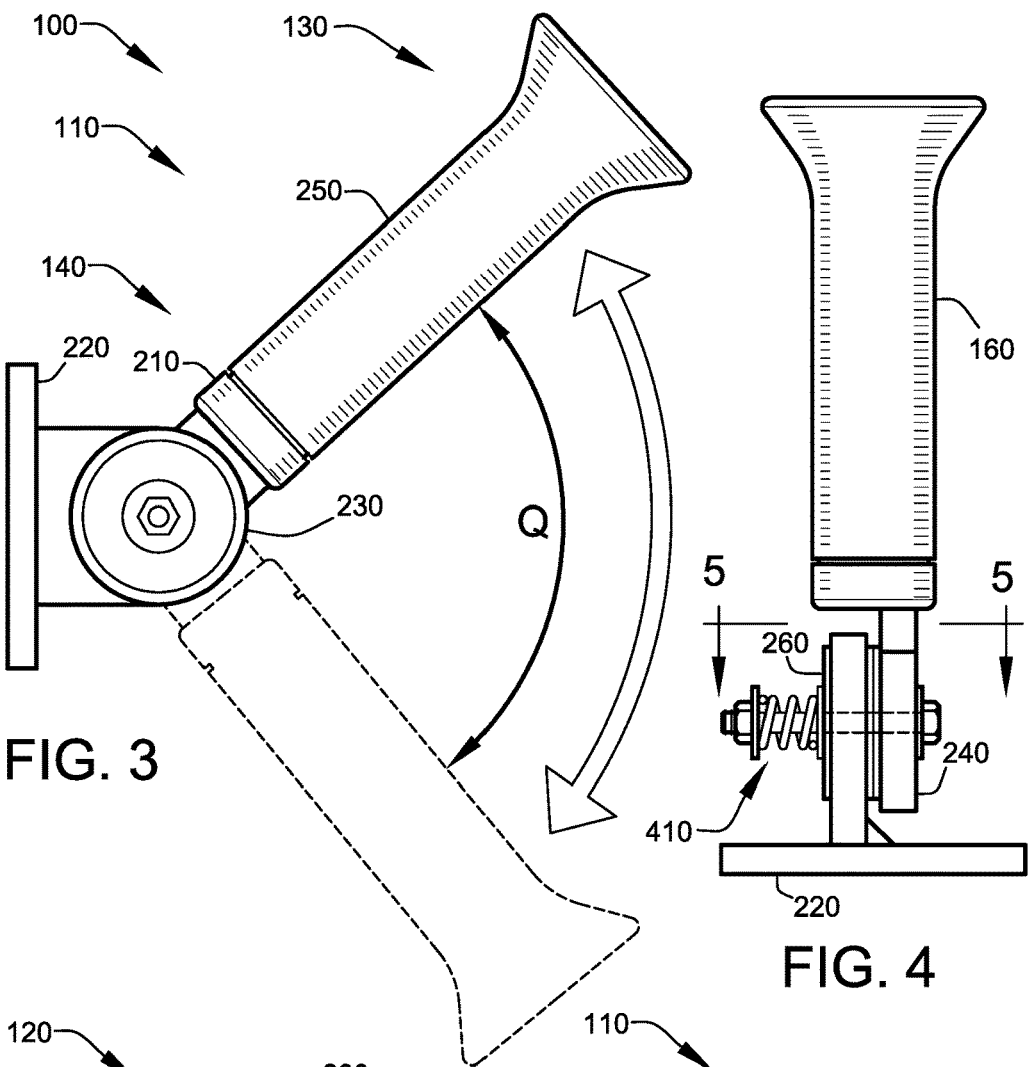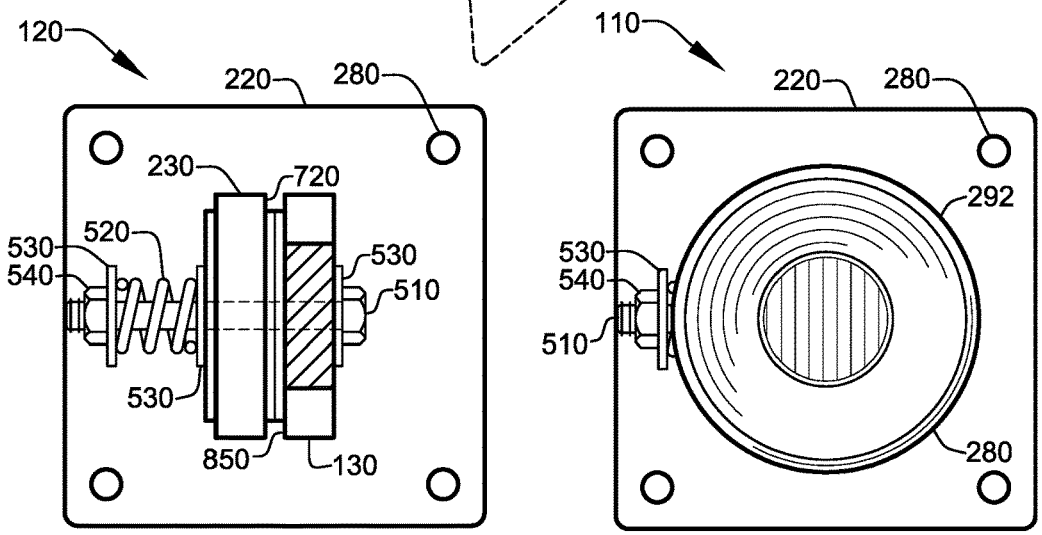

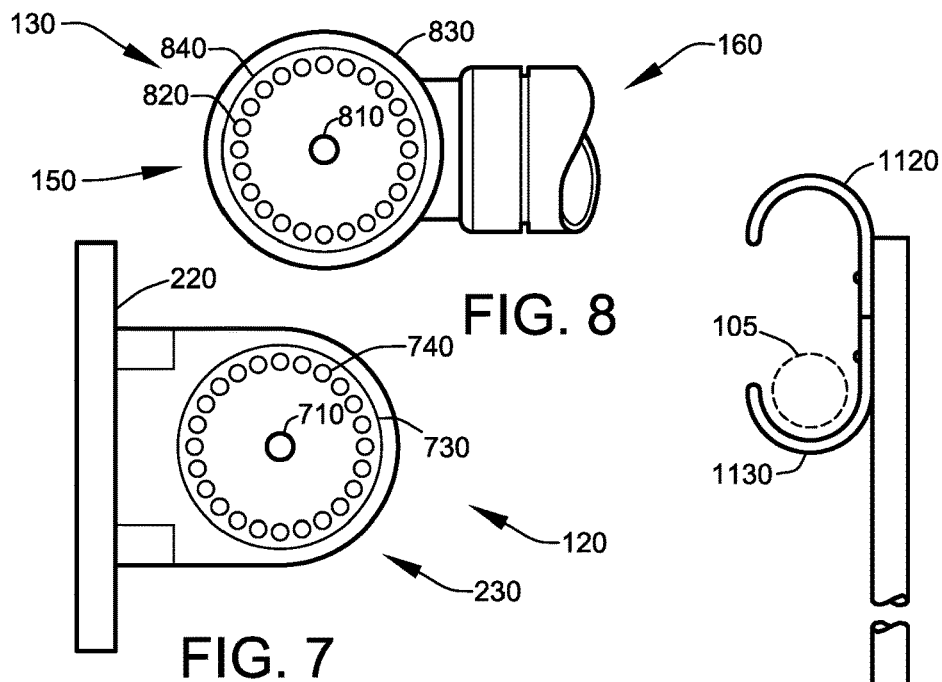
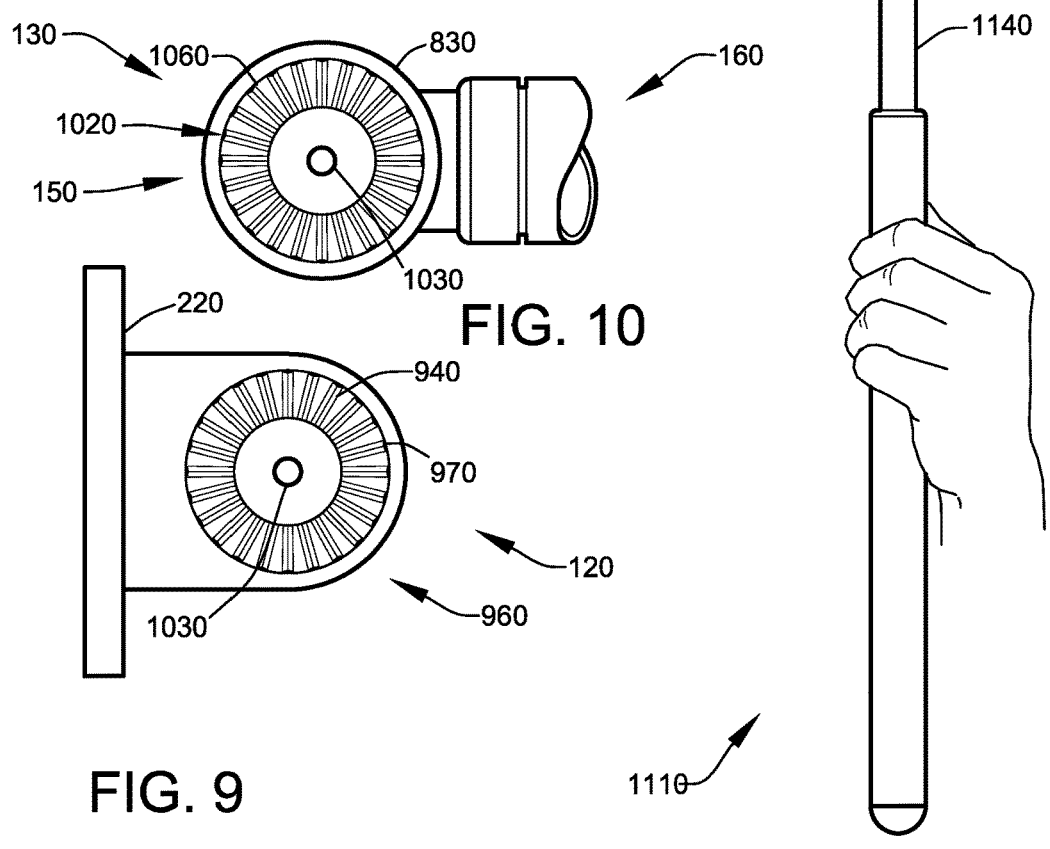

FLAG MOUNT BRACKET SYSTEMS

CROSS-REFERENCE TO RELATED APPLICATION

The present application is related to and claims priority from prior provisional application Ser. No. 62/100,399, filed Jan. 6, 2015, entitled "FLAG MOUNT BRACKET SYSTEMS", the contents of which are incorporated herein by this reference and is not admitted to be prior art with respect to the present invention by the mention in this cross-reference section.

BACKGROUND

Many people have a flag bracket attached to the eaves of their home in order to fly a national flag on appropriate holidays, to fly a flag commemorating various holidays, to fly a state flag, or simply to fly a decorative flag.

The present invention relates to providing a system for improved installation of a flag into a bracket and raising it to the desired height and angle of flying from ground level without the need for a ladder. More particularly this invention relates to providing a system for placing a flag into a bracket, securing the flagpole in the bracket, and raising the flag to the desired height and angle of flying from ground level without the need to climb a ladder. Moreover, the present invention provides a feature which will prevent the flag from wrapping around the pole on a windy day, allowing the flag to always be visible while flying. Additionally, the present invention provides a system for doing all of the above with a bracket that is hidden on the underside of the eaves of the roof so that the bracket, when not in use, cannot be easily seen.

OBJECTS AND FEATURES OF THE INVENTION

A primary object and feature of the present invention is to provide a system overcoming the above-mentioned problem.

A further primary object and feature of the present invention is to provide a system that allows a user to place a flag in a bracket and raise it to a desired height and angle without the need to use a ladder.

A further primary object and feature of the present invention is to provide such a system that allows a user to safely place a flag in a bracket from the ground, and with the assistance of a specially designed pole, raise the flag to the desired height and angle and secure it at that height and angle.

A further primary object and feature of the present invention is to provide such a system that allows for a flag to be locked in place such that it will not come down unless the specially designed pole is used to disengage the lock on the bracket.

Yet another primary object and feature of the present invention is to provide such a system that allows for a flag to be lowered slowly and safely after disengaging the bracket lock with the specially designed pole.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a flag mount system, relating to a user's capability to post and retrieve at least one flag at a height greater than the hand-reach of the user while standing upon the ground, comprising: at least one flag-pole receiver structured and arranged to receive posting of the at least one flag on at least one flag pole; at least one surface mount structured and arranged to mount on at least one substantially vertical surface at a height greater than the hand-reach of the user; at least one flag-pole retainer structured and arranged to retain at least one end of such at least one flag pole in such at least one flag-pole receiver until the user retrieves the at least one flag; at least one connector structured and arranged to connect such at least one flag-pole receiver and such at least one surface mount; wherein such at least one connector comprises at least one rotation permitter structured and arranged to permit rotation of such at least one flag-pole receiver of at least 90 degrees; wherein such rotation comprises a full-mast raised position of the at least one flag, a half-mast raised position of the at least one flag, and a lowered position of the at least one flag; wherein after posting the at least one flag, upward movement of such at least one flag pole by the user rotates such at least one flag-pole receiver toward at least one raised position of such full-mast raised position and such half-mast raised position; wherein such at least one rotation permitter comprises at least one position maintainer structured and arranged to maintain such at least one raised position until released, and at least one position releaser structured and arranged to release such at least one raised position and permitting lowering of such at least one flag-pole receiver to such lowered position, wherein such at least one position maintainer and such at least one position releaser are activated through manipulation of such at least one flag pole by the user while the user is standing on the ground; wherein, when such at least one surface mount is at a height greater than the hand-reach of the user, such at least one flag-pole receiver requires such lowered position to post and retrieve the at least one flag; wherein such at least one surface mount is now mountable at a height greater than the hand-reach of the user while the user is still able to post, raise, lower and retrieve the flag while standing on the ground. Moreover, it provides such a flag mount system further comprising at least one flag-pole manipulator structured and arranged to permit user-manipulation of such at least one flag pole when such at least one flag pole is out of the hand-reach of the user while the user is standing on the ground.

Additionally, it provides such a flag mount system further comprising at least one flag-pole axial twister structured and arranged to axial twist such at least one flag pole preventing the at least one flag from wrapping around such at least one flag pole. Also, it provides such a flag mount system further comprising at least one eaves-retractor structured and arranged to retract such at least one flag-pole receiver under at least one roof eaves when in such lowered position. In addition, it provides such a flag mount system wherein such at least one flag-pole retainer comprises at least one friction-fit retainer structured and arranged to retain such at least one flag pole in such at least one flag-pole receiver through friction. And, it provides such a flag mount system wherein such at least one friction-fit retainer mounts to such at least one flag pole.

Further, it provides such a flag mount system wherein such at least one flag-pole receiver further comprises at least one pole-end guide structured and arranged to guide such at least one end of such at least one flag-pole into alignment with such at least one flag-pole receiver. Even further, it provides such a flag mount system wherein such at least one pole-end guide comprises a funnel-shaped structure. Moreover, it provides such a flag mount system wherein such at least one position maintainer maintains positions at about 15 degree intervals.

In accordance with another preferred embodiment hereof, this invention provides a flag mount system, relating to a user's capability to post and retrieve at least one flag at a height greater than the hand-reach of the user while standing upon the ground, comprising: at least one flag-pole receiver structured and arranged to receive an end of at least one flag pole at an upward angle; at least one surface mount structured and arranged to mount on at least one substantially vertical surface at a height greater than the hand-reach of the user; at least one coupler structured and arranged to couple such at least one flag-pole receiver to such at least one surface mount; wherein such at least one coupler permits rotation of such at least one flag-pole receiver with respect to such at least one surface mount over at least a range of 90 degrees; at least one position stop structured and arranged to stop and maintain such at least one coupler at at least one display position of the at least one flag; at least one position release structured and arranged to release such at least one coupler maintained at such at least one display position and permit such at least one flag-pole receiver to rotate down to allow user retrieval of the at least one flag while the user is standing on the ground; wherein, when such at least one surface mount is at a height greater than the hand-reach of the user, such at least one flag-pole receiver requires a lowered position to post and retrieve the at least one flag; wherein such at least one surface mount is now mountable at a height greater than the hand-reach of the user while the user is still able to post, raise, lower and retrieve the flag while standing on the ground.

Additionally, it provides such a flag mount system further comprising at least one flag-pole hook-rod structured and arranged to permit user-manipulation of such at least one flag pole when such at least one flag pole is out of the hand-reach of the user while the user is standing on the ground. Also, it provides such a flag mount system wherein such at least one flag-pole receiver comprises at least one under-eaves configuration structured and arranged to retract under eaves of a roof when rotated down. In addition, it provides such a flag mount system further comprising at least one friction grommet structured and arranged to fit on the end of such at least one flag pole and create a friction fit between such at least one flag-pole receiver and such at least one flag pole.

And, it provides such a flag mount system wherein such at least one flag-pole receiver further comprises at least one funnel-end structured and arranged to guide such end of such at least one flag pole into such at least one flag-pole receiver. Further, it provides such a flag mount system wherein such at least one position stop stops and maintains positions at about 15 degree intervals.

In accordance with another preferred embodiment hereof, this invention provides a flag mount system, relating to a user's capability to post and retrieve at least one flag at a height greater than the hand-reach of the user while standing upon the ground, comprising: flag-pole receiver means for receiving posting of the at least one flag on at least one flag pole; surface mount means for mounting on at least one substantially vertical surface at a height greater than the hand-reach of the user; flag-pole retainer means for retaining at least one end of such at least one flag pole in such flag-pole receiver means until the user retrieves the at least one flag; connector means for connecting such flag-pole receiver means and such surface mount means; wherein such connector means comprises rotation permitter means for permitting rotation of such flag-pole receiver of at least 90 degrees; wherein such rotation comprises a full-mast raised position of the at least one flag, a half-mast raised position of the at least one flag, and a lowered position of the at least one flag; wherein after posting the at least one flag, upward movement of such at least one flag pole by the user rotates such flag-pole receiver means to rotate toward at least one raised position of such full-mast raised position and such half-mast raised position; wherein such rotation permitter means comprises position maintainer means for maintaining such at least one raised position until released, and position releaser means for releasing such at least one raised position and permitting lowering of such flag-pole receiver means to such lowered position, wherein such position maintainer means and such position releaser means are activated through manipulation of such at least one flag pole by the user while the user is standing on the ground; wherein, when such surface mount means is at a height greater than the hand-reach of the user, such flag-pole receiver means requires such lowered position to post and retrieve the at least one flag; wherein such surface mount means is now mountable at a height greater than the hand-reach of the user while the user is still able to post, raise, lower and retrieve the flag while standing on the ground.

Even further, it provides such a flag mount system further comprising flag-pole manipulator means for user manipulation of such at least one flag pole when such at least one flag pole is out of the hand-reach of the user while the user is standing on the ground. Even further, it provides such a flag mount system further comprising flag-pole axial twister means for axial twisting such at least one flag pole preventing the at least one flag from wrapping around such at least one flag pole. Even further, it provides such a flag mount system further comprising eaves-retractor means for retracting such flag-pole receiver means under at least one roof eaves when in such lowered position. Even further, it provides such a flag mount system wherein such flag-pole receiver means further comprises pole-end guide means for guiding such at least one end of such at least one flag-pole into alignment with such flag-pole receiver means. Each and every novel feature, element, combination, step and/or method disclosed or suggested by this patent application.

BRIEF DESCRIPTION OF THE DRAWINGS

FIG. 2B shows a perspective view of flag-arm portion of flag-mount bracket depicting flag-securing sheath extended out of flag-arm portion, according to a preferred embodiment of FIG. 2A.

FIG. 3 shows a side view of the flag-mount bracket, according to a preferred embodiment of FIG. 2.

FIG. 4 shows a top view of the flag-mount bracket, according to a preferred embodiment of FIG. 3.

FIG. 5 shows a sectional front view 5-5 of FIG. 4 showing flag-mount bracket, according to a preferred embodiment of FIG. 4.

FIG. 6 shows a front view of the flag-mount bracket, according to a preferred embodiment of FIG. 5.

FIG. 7 shows a side view of the bracket-mount portion of flag-mount bracket, according to a preferred embodiment of FIG. 2A.

FIG. 8 shows a partial side view of the flag-arm portion of flag-mount bracket, according to a preferred embodiment of FIG. 7.

FIG. 9 shows a side view of the bracket-mount portion of flag-mount bracket, according to an alternately preferred embodiment of the present invention.

FIG. 10 shows a partial side view of the flag-arm portion of flag-mount bracket, according to an alternately preferred embodiment of FIG. 9.

FIG. 11 shows a partial side view of a specially designed flag-mount-posting pole, according to the preferred embodiment of FIG. 1.

FIG. 20 shows a perspective view of flag-arm portion of flag-mount bracket depicting flag-securing stopper on the flag pole, according to a preferred embodiment of FIG. 15.

DETAILED DESCRIPTION OF THE BEST MODES AND PREFERRED EMBODIMENTS OF THE INVENTION

Generally, in order to post a flag in most flag brackets of today, in a location in which a user would choose to fly a flag (on the eaves of a structure, on a column of a structure, on an exterior wall of a structure, etc.) the bracket must be located above the hand-reach of the user in order for the flag to fly high enough to avoid interference with its ability to fly properly. As a result a user must climb a ladder, adjust the bracket to the desired angle and height (if the user can and needs to), loosen a bolt or screw, post the flag into the bracket, tighten the bolt or screw, and then climb down the ladder. Conversely, when the user desires to remove the flag, he/she must again climb a ladder, loosen the bolt or screw, retrieve the flag and then climb back down the ladder. This can be dangerous, especially for people who are elderly, disabled, or short in stature, making it difficult for them to safely climb up and down a ladder. For the purposes of this application, it will be understood that the hand-reach of the user is the height at which a flag bracket may still be reached from the ground by a user and post a flag directly at a display angle without the need of removing feet from the ground (ie. climb a ladder or stool). In other words, a user can hold the end of the flag pole at about a 45 degree angle above horizontal and still reach high enough from the ground to insert the end of the flag pole into the bracket. While Applicant understands that the measured height of the hand-reach will vary user to user, the features of the invention directly addresses the ability of the user to post a flag using the invention described herein to a bracket at a height above the hand-reach of the user. Features of this invention disclosed herein permits the posting of a flag to be achieved at an upward angle rather than a downward or horizontal angle, thus extending the bracket height a user can post a flag to without extending the hand-reach of the user.

Additionally, most flag brackets are designed to hold a flag in a static position. As a result, when there is more than a slight breeze, the flag will tend to blow around the pole until it is completely wrapped around the pole and no longer visible. Furthermore, there may be situations where a person may want the flagpole bracket to be hidden, when not in use, or to have only the flag itself visible when it is in use.

Figure 1:
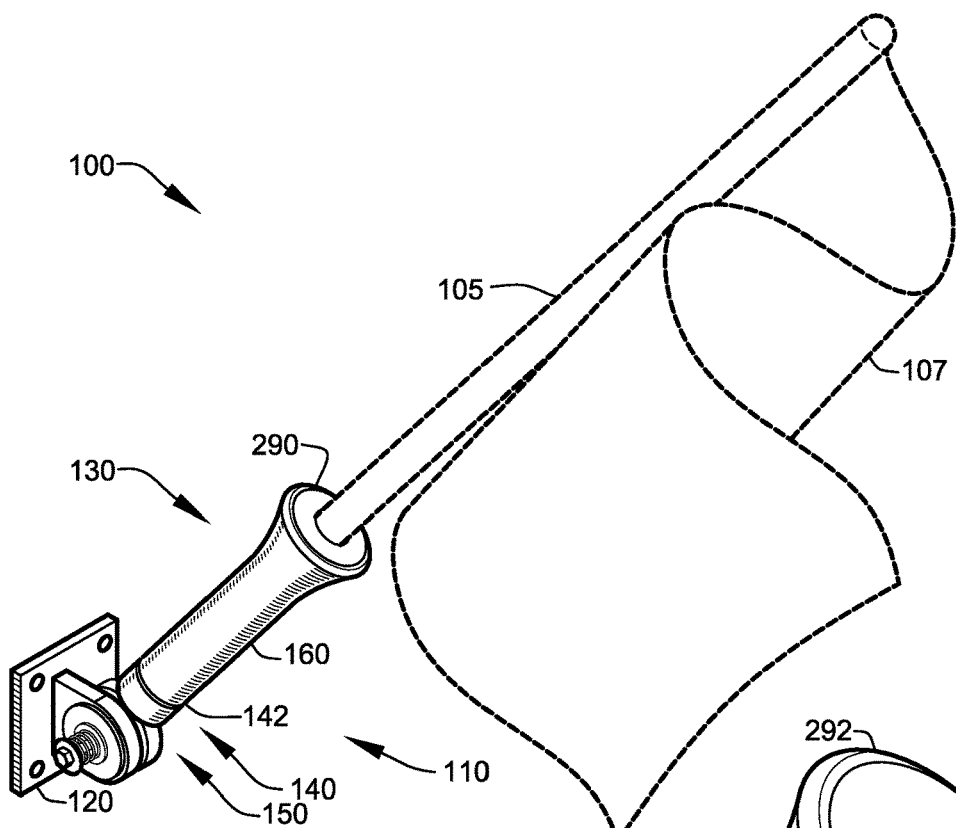
FIG. 1 shows a perspective view of the flag-mount bracket of flag-mount bracket system in use with a flag posted and raised, according to a preferred embodiment of the present invention.
Figure 2A:
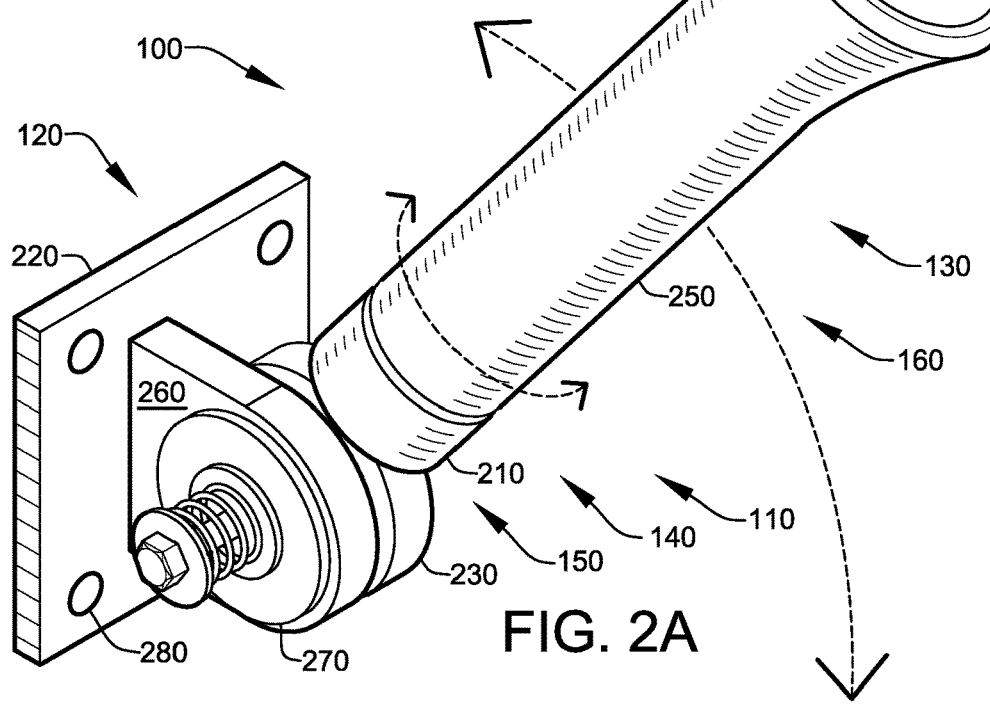
FIG. 2A shows a perspective view of the flag-mount bracket, according to a preferred embodiment of FIG. 1.

FIG. 1 shows a perspective view of the flag-mount bracket 110 of flag-mount bracket system 100 in use with a flag 107 posted and raised, according to a preferred embodiment of the present invention. FIG. 2A shows a perspective view of the flag-mount bracket 110, according to a preferred embodiment of FIG. 1. FIG. 2B shows a partial side perspective view of flag-arm portion 130 of flag-mount bracket 110 depicting flag-securing sheath 290 on the end of flag pole 105 extended out of flag-arm portion 130, according to a preferred embodiment of FIG. 2A. FIG. 7 shows a side view of the bracket-mount portion 120 of flag-mount bracket 110, according to a preferred embodiment of FIG. 2A. FIG. 8 shows a partial side view of the flag-arm portion 130 of flag-mount bracket 110, according to a preferred embodiment of FIG. 7. FIG. 9 shows a side view of the bracket-mount portion 120 of flag-mount bracket 110, according to an alternately preferred embodiment of the present invention. FIG. 10 shows a partial side view of the flag-arm portion 130 of flag-mount bracket 110, according to an alternately preferred embodiment of FIG. 9.

Flag-mount bracket 110 preferably comprises at least one bracket-mount portion 120 (at least embodying herein at least one surface mount structured and arranged to mount on at least one substantially vertical surface at a height greater than the hand-reach of the user; and at least embodying herein at least one surface mount on at least one substantially vertical surface at a height greater than the hand-reach of the user; and at least embodying herein surface mount means for mounting on at least one substantially vertical surface at a height greater than the hand-reach of the user) structured and arranged to mount on a structure, such as, for example, a building façade, a building eave, a building column, etc., and at least one flag-arm portion 130 (at least embodying herein at least one flag-pole receiver structured and arranged to receive posting of the at least one flag on at least one flag pole; and at least embodying herein at least one flag-pole receiver structured and arranged to receive an end of at least one flag pole at an upward angle; and at least embodying herein flag-pole receiver means for receiving posting of the at least one flag on at least one flag pole) structured and arranged to receive and post a flag, as shown.

Flag-mount bracket 110 preferably comprises at least one durable material, preferably durable metal, preferably aluminum, alternately preferably durable plastic, preferably nylon. Upon reading the teachings of this specification, those skilled in the art will now appreciate that, under appropriate circumstances, considering such issues as user preference, cost, available materials, new technology, etc., other materials, such as, for example, pot metal, die cast metal, steel, other metals, polyurethane, polypropylene, polyethylene, other plastics, etc., may suffice.

Flag-mount bracket 110 preferably comprises molded construction, alternately preferably welded construction. Upon reading the teachings of this specification, those skilled in the art will now appreciate that, under appropriate circumstances, considering such issues as user preference, materials used, manufacturing preferences etc., other forms of construction, such as, for example, 3-D printing, CNC construction, bonding, etc., may suffice.

Bracket-mount portion 120 preferably comprises at least one bracket-mount-plate portion 220 and at least one flag-arm-attacher portion 230 (see FIG. 2A). Flag-arm portion 130 preferably comprises at least one bracket-attacher end 150 and at least one flag-receiver arm 160 (see FIG. 2A).

Bracket-mount-plate portion 220 preferably comprises square shaped plate, as shown. Upon reading the teachings of this specification, those skilled in the art will now appreciate that, under appropriate circumstances, considering such issues as user preference, cost, available materials, etc., other shapes, such as, for example, rectangular shape, oval shape, round shape, etc., may suffice. Bracket-mount-plate portion 220 preferably further comprises at least one hole 280, preferably at least four holes 280, structured and arranged to allow attaching flag-mount bracket 110 to the desired mount location, as shown. Each of the at least four holes 280 are preferably located at a corner of bracket-mount-plate portion 220, as shown. Bracket-mount-plate portion 220 is preferably mounted to the desired location using at least one fastener, preferably screws. Upon reading the teachings of this specification, those skilled in the art will now appreciate that, under appropriate circumstances, considering such issues as user preference, cost, available materials, etc., other fasteners, such as, for example, wood screws, flat head screws, round head screws, counter-sunk screws, bolts, other fasteners, etc., may suffice.

Flag-arm-attacher portion 230 preferably attaches to bracket-mount-plate portion at a 90 degree angle relative to the plane of bracket-mount-plate portion, as shown. Flag-arm-attacher portion 230 preferably comprises hole 710 (see FIG. 7) through the center of the end of flag-arm-attacher portion 230 that is opposite bracket-mount-plate portion 220. Flag-arm-attacher portion 230 preferably comprises at least one outer face 260 (see FIG. 2). Outer face 260 preferably comprises at least one raised area 270 around hole 710, as shown. Raised area 270 preferably comprises at least one shape, preferably a circular shape, as shown. Upon reading the teachings of this specification, those skilled in the art will now appreciate that, under appropriate circumstances, considering such issues as user preference, shape of flag-arm-attacher portion 230, etc., other raised area shapes, such as, for example, oval, square, rectangle, etc., may suffice.

Flag-arm-attacher portion 230 preferably further comprises at least one inner face 720 (See FIG. 7). Inner Face 720 preferably comprises at least one raised area 730 around hole 710, as shown. Raised area 730 preferably comprises at least one shape, preferably a circular shape, as shown. Upon reading the teachings of this specification, those skilled in the art will now appreciate that, under appropriate circumstances, considering such issues as user preference, shape of flag-arm-attacher portion 230 etc., other raised area shapes, such as, for example, oval, square, etc., may suffice. Raised area 730 preferably further comprises at least one hemispherical divot 740, preferably a plurality of hemispherical divots 740 structured and arranged to be located at 15 degree increments around the perimeter of raised area 730, as shown. Hemispherical divots 740 preferably correspond to hemispherical bumps 820 of bracket-attacher end 150 of flag-arm portion 130 of flag-mount bracket 110 (see FIG. 8) which will be discussed below.

Flag-arm portion 130 preferably comprises at least one bracket-attacher end 150 (at least embodying herein at least one connector structured and arranged to connect said at least one flag-pole receiver and said at least one surface mount; and at least embodying herein at least one coupler structured and arranged to couple said at least one flag-pole receiver to said at least one surface mount; and at least embodying herein connector means for connecting said flag-pole receiver means and said surface mount means) structured and arranged to attach Flag-arm portion 130 to bracket mount portion 120, as shown. Bracket-attacher end 150 preferably comprises at least one attacher-plate portion 830, as shown. Attacher-plate portion 830 preferably comprises at least one shape which corresponds to the shape of raised area 730 of flag-arm-attacher portion 130, as shown. Bracket-attacher end 150 preferably comprises at least one raised area 840 (see FIG. 8) which corresponds in shape and size to raised area 730 of flag-arm attacher portion 130.

Bracket-attacher end 150 preferably further comprises at least one outer face 240. Outer face 240 comprises a smooth surface. Bracket-attacher end 150 preferably further comprises at least one hole 810 in the center which corresponds to hole 710 of flag-arm attacher portion 230, as shown. Bracket-attacher end 150 preferably further comprises at least one inner face 850, as shown. Inner face 850 preferably comprises at least one raised area 840, as shown. Raised area 840 preferably comprises at least one hemispherical bump 820, preferably a plurality of hemispherical bumps 820 structured and arranged to be located at 15 degree increments around the perimeter of raised area 840, as shown. The plurality of hemispherical bumps 820 preferably correspond to the plurality of hemispherical divots 740 of flag-arm-attacher portion 230 of bracket-mount portion 120 of flag-mount bracket 110 (see FIG. 8).

Flag-arm portion 130 preferably comprises at least one flag-receiver arm 160 structured and arranged to receive flag pole 105. Flag-receiver arm 160 is preferably molding attached, alternately preferably welding attached to bracket-attacher end 150, as shown. Flag-receiver arm 160 preferably comprises cylindrical tube. Flag-receiver end 292 of flag-receiver arm 160 preferably comprises a flared construction such that flag-receiver arm 160 comprises a "trumpet-like" shape which allows for easier insertion of a flag pole into flag-mount bracket 110 (at least herein embodying wherein said at least one flag-pole receiver further comprises at least one pole-end guide structured and arranged to guide such at least one end of such at least one flag-pole into alignment with said at least one flag-pole receiver; and at least herein embodying wherein said at least one pole-end guide comprises a funnel-shaped structure; and at least herein embodying wherein said at least one flag-pole receiver further comprises at least one funnel-end structured and arranged to guide such end of such at least one flag pole into said at least one flag-pole receiver; and at least herein embodying wherein said flag-pole receiver means further comprises pole-end guide means for guiding such at least one end of such at least one flag-pole into alignment with said flag-pole receiver means), as shown. Flag-receiver arm 160 preferably further comprises at least one flag-securing sheath 290 (at least herein embodying at least one flag-pole retainer structured and arranged to retain at least one end of such at least one flag pole in said at least one flag-pole receiver until the user retrieves the at least one flag; and at least herein embodying wherein said at least one flag-pole retainer comprises at least one friction-fit retainer structured and arranged to retain such at least one flag pole in said at least one flag-pole receiver through friction; and at least herein embodying wherein said at least one friction-fit retainer mounts to such at least one flag-pole; and at least embodying herein at least one friction grommet structured and arranged to fit on the end of such at least one flag pole and create a friction fit between said at least one flag-pole receiver and such at least one flag pole; and at least herein embodying flag-pole retainer means for retaining at least one end of such at least one flag pole in said flag-pole receiver means until the user retrieves the at least one flag) structured and arranged to fit inside flag receiver arm 160 to allow for a secure posting of flag 107, as shown. Flag-securing sheath 290 preferably comprises pliable-metal-engaging material, preferably silicone. Flag-securing sheath 290 is preferably placed on the end of flag pole 105 opposite flag 107, as shown. Flag-securing sheath 290 preferably further comprises at least one securing-set-screw 294 structured and arranged to screw into flag pole 105 to secure flag-securing sheath onto flag pole 105, (see FIG. 2B). When flag pole 105 is preferably posted into flag-mount bracket 110, flag-securing sheath 290 engages flag-mount bracket 110 to hold flag pole 105 securely within flag-mount bracket 110 (see FIG. 1).

Flag-receiver arm 160 preferably comprises a cut in the cylinder which divides flag-receiver arm 160 (at least herein embodying wherein into two sections, as shown. Therefore, flag-receiver arm 160 preferably comprises static-section 210 and rotational-section 250 (at least embodying herein at least one flag-pole axial twister structured and arranged to axial twist such at least one flag pole preventing the at least one flag from wrapping around such at least one flag pole; and at least embodying herein flag-pole axial twister means for axial twisting such at least one flag pole preventing the at least one flag from wrapping around such at least one flag pole). Rotational-section 250 is attached to static-section 210 such that rotational-section 250 is free to axially rotate 360 degrees. The details of the assembly to attach rotational-section 250 to static-section 210 are not provided here, since one of ordinary skill in the art, upon reading this specification, will appreciate how the present embodiments may be used in conjunction with such assembly. Rotational-section 250 preferably comprises flag-wrapping-preventer 140 for preventing flag 107 from wrapping around the flag pole 105 when there is a strong wind, as shown. Flag-wrapping-preventer 140 preferably comprises rotational point 142 between rotational-section 250 and static-section 210 structured and arranged to allow rotational-section 250 to rotate 360 degrees. When a wind which would tend to blow flag 107 around flag pole 105, flag-wrapping-preventer 140 will allow rotational-section of flag-receiver arm 160 to rotate at rotational point 142 thus preventing flag 107 from wrapping around flag pole 107, as shown.

FIG. 9 shows a side view of the bracket-mount portion 910 of flag-mount bracket 110, according to an alternately preferred embodiment of the present invention. FIG. 10 shows a partial side view of the flag-arm portion 130 of flag-mount bracket 110, according to an alternately preferred embodiment of FIG. 9. Bracket-mount portion 910 replaces bracket-mount portion 120 and flag-arm portion 1010 replaces flag-arm portion 130, as shown. Bracket-mount portion 910 and flag-arm portion 1010 are assembled in the same manner, described below, as bracket-mount portion 120 and flag-arm portion 130. Many of the features of bracket-mount portion 910 and flag-arm portion 1010 are repeated from preferred bracket-mount portion 120 and flag-arm portion 130 respectively of flag-mount bracket 110, as shown.

Bracket-mount portion 910 preferably comprises bracket-mount-plate portion 220 and flag-arm-attacher portion 960, as shown. Flag-arm-attacher portion 960 preferably comprises inner face 920, as shown. Inner face 920 preferably comprises raised area 970, as shown. Raised area 970 preferably comprises "saw tooth" 970, preferably a plurality of "saw teeth" 970 structured and arranged to replace the hemispherical divots 740. "Saw teeth" 970 preferably comprise alternating teeth and grooves.

Flag-arm portion 1010 preferably comprises bracket-attacher end 1050 and flag-receiver arm 1060, as shown. Bracket-attacher end 1050 preferably comprises inner face 850, as shown. Inner face 850 preferably comprises raised area 1060, as shown. Raised area 1060 preferably comprises "saw tooth" 1020, preferably a plurality of "saw teeth" 1020 structured and arranged to replace the hemispherical divots 740, as shown. "Saw teeth" 1020 preferably comprise alternating teeth and grooves, as shown. "Saw-teeth" 1020 (at least herein embodying wherein said at least one position maintainer maintains positions at about 15 degree intervals; and at least herein embodying wherein said at least one position stop stops and maintains positions at about 15 degree intervals) are structured and arranged to be located at 15 degree increments similar to the location of hemispherical divots 740 and hemispherical bumps 820, as shown.

FIG. 3 shows a side view of the flag-mount bracket 110, depicting the rotation of flag-mount bracket 110, according to a preferred embodiment of FIG. 2. FIG. 4 shows a top view of the flag-mount bracket, depicting flag-mount bracket 110 fully assembled, according to a preferred embodiment of FIG. 3. FIG. 5 shows a sectional front view 5-5 of FIG. 4 showing flag-mount bracket 110, with flag-receiver arm 160 removed to show bracket-mount portion 120 assembled with flag-arm portion 130, according to a preferred embodiment of FIG. 4. FIG. 6 shows a front view of the flag-mount bracket 110, with flag-receiver arm 160 in place, according to a preferred embodiment of FIG. 5.

Flag-mount bracket 110 preferably further comprises spring assembly 410 (see FIG. 4). Spring assembly 410 preferably comprises at least one at least one fastener, preferably at least one bolt 510 and at least one nut 540, as shown. Upon reading the teachings of this specification, those skilled in the art will now appreciate that, under appropriate circumstances, considering such issues as user preference, available materials, manufacturing preference, etc., other fasteners, such as, for example, screws, rivets, anchor screws, etc., may suffice. Spring assembly 410 further comprises at least one spring 520 (see FIG. 5), and at least one washer 530, preferably at least three washers 530 (see FIG. 5).

Flag-mount bracket 110 is preferably assembled by putting bracket-mount portion 120 and flag-arm portion 130 together; raised area 270 comprising inner face 720 is aligned with raised area 840 comprising inner face 850. Inner face 720 and inner face 850 are preferably aligned such that hemispherical bumps 820 align to fit inside hemispherical divots 740. Bolt 510 is placed through at least one washer 530, hole 810 of bracket-attacher end 150 of flag-arm portion 130, hole 710 of flag-arm-attacher portion 230, at least one washer 530, spring 520 and at least one washer 530, as shown. Nut 540 is then screwed onto bolt 510, and tightened to hold the assembly together, as well as to place a compression force on spring 520, as shown.

The compression force on spring 520 pushes bracket-attacher end 150 and flag-arm-attacher portion 230 tightly together, as shown. As flag-mount bracket 110 is rotated, hemispherical bumps 820 (at least herein embodying wherein slide out of hemispherical divots and then "pop" back into an adjacent hemispherical divot, allowing flag-arm portion 130 to be locked at a user chosen angle. The more compression nut 540 exerts onto spring 520, the more difficult it becomes to rotate flag-arm portion 130. Each divot 740/bump 820 position constitutes a stop-angle Q (see FIG. 3). Stop-angle Q preferably comprises any angle between 0 degrees (flag-arm portion 130 pointing straight down at the ground) to 180 degrees (flag-arm portion 130 pointing straight upward). As discussed above, divots 740 and bumps 820 are positioned at 15 degree increments. Therefore a user can choose to "lock" flag-arm portion 130 at any stop-angle Q desired between 0 degrees and 180 degrees at 15 degree increments.

FIG. 11 shows a partial side view of a specially designed flag-mount-posting pole 1110 (at least embodying herein at least one flag-pole manipulator structured and arranged to permit user-manipulation of such at least one flag pole when such at least one flag pole is out of the hand-reach of the user while the user is standing on the ground; and at least embodying herein at least one flag-pole hook-rod structured and arranged to permit user manipulation of such at least one flag pole when such at least one flag pole is out of the hand-reach of the user while the user is standing on the ground; and at least herein embodying flag-pole manipulator means for user manipulation of such at least one flag pole when such at least one flag pole is out of the hand-reach of the user while the user is standing on the ground) of flag-mount bracket system 100, according to the preferred embodiment of FIG. 1. Flag-mount bracket system 100 preferably comprises flag-mount-posting pole 1110 structured and arranged to allow a user to post, retrieve, raise and lower a flag 107 from the ground without the need to use a ladder, as shown. Flag-mount-posting pole 1110 preferably comprises at least one pole, preferably at least one telescoping pole 1140, as shown. The details of the structure and assembly of telescoping pole 1140 is not provided here, since one of ordinary skill in the art, upon reading this specification, will appreciate how the present embodiments may be used in conjunction with such structure and assembly. Flag-mount-posting pole 1110 preferably further comprises at least one raising hook 1130 structured and arranged to aid a user in raising flag 107 from the ground without the need to use a ladder; and at least one lowering-hook 1120 structured and arranged to aid a user in lowering flag 107 from the ground without the need to use a ladder, as shown.

In order to post and raise a flag, a user would telescope flag-mount-posting pole 1110 (at least herein embodying wherein said at least one position maintainer and said at least one position releaser are activated through manipulation of such at least one flag pole by the user while the user is standing on the ground; and at least herein embodying wherein said position maintainer means and said position releaser means are activated through manipulation of such at least one flag pole by the user while the user is standing on the ground) to a desired length which would allow the user to reach flag-mount bracket 110 without the need for a ladder. The user would then lower flag-mount-bracket 110 to a "posting" position (illustrated by the dashed line on FIG. 3) by reaching up and inserting flag-mount bracket 110 between raising hook 1130 and lowering hook 1120, and pulling downward on flag-mount bracket with lowering hook 1120 (at least herein embodying wherein, when said at least one surface mount is at a height greater than the hand-reach of the user, said at least one flag-pole receiver requires such lowered position to post and retrieve the at least one flag; and at least herein embodying wherein said at least one surface mount is now mountable at a height greater than the hand-reach of the user while the user is still able to post, raise, lower and retrieve the flag while standing on the ground; and at least herein embodying wherein said at least one surface mount is at a height greater than the hand-reach of the user, said at least one flag-pole receiver requires a lowered position to post and retrieve the at least one flag; and at least herein embodying wherein said at least one surface mount is now mountable at a height greater than the hand-reach of the user while the user is still able to post, raise, lower and retrieve the flag while standing on the ground; and at least herein embodying wherein, when said surface mount means is at a height greater than the hand-reach of the user, said flag-pole receiver means requires such lowered position to post and retrieve the at least one flag; and at least herein embodying wherein said surface mount means is now mountable at a height greater than the hand-reach of the user while the user is still able to post, raise, lower and retrieve the flag while standing on the ground). Flag-mount bracket 110 will rotate downward, clicking into each 15 degree increment until it has reached the desired position. Flag pole 107 with flag-securing-sheath 290 attached can then be posted into flag-receiver end 292 of flag receiver arm 160; and then using the raising hook 1130, the user raise the flag to any desired stop-angle Q (at least herein embodying wherein after posting the at least one flag, upward movement of such at least one flag pole by the user rotates said at least one flag-pole receiver toward at least one raised position of such full-mast raised position and such half-mast raised position; and at least herein embodying wherein after posting the at least one flag, upward movement of such at least one flag pole by the user rotates said flag-pole receiver means to rotate toward at least one raised position of such full-mast raised position and such half-mast raised position) which the user deems appropriate to fly flag 107.

Figure 13:
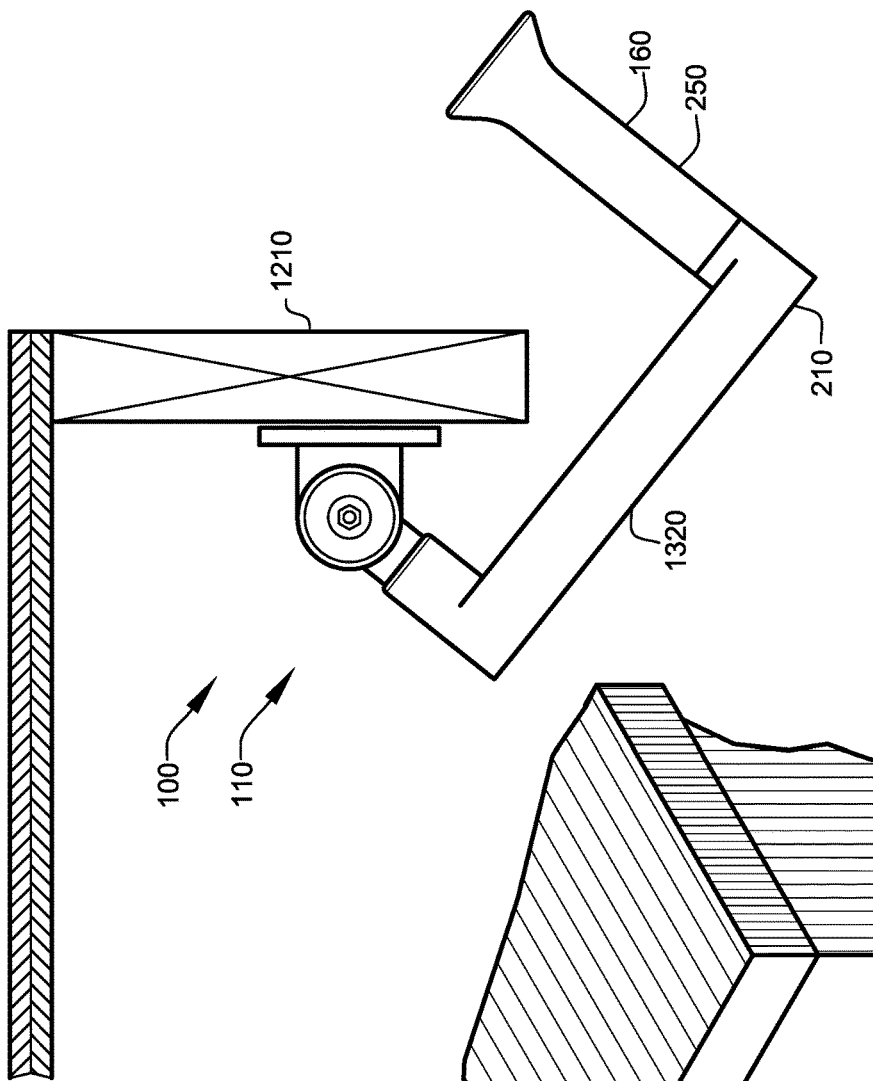
FIG. 13 shows a side view of the flag-mount bracket in use, according to the preferred embodiment of FIG. 12.
Figure 12:
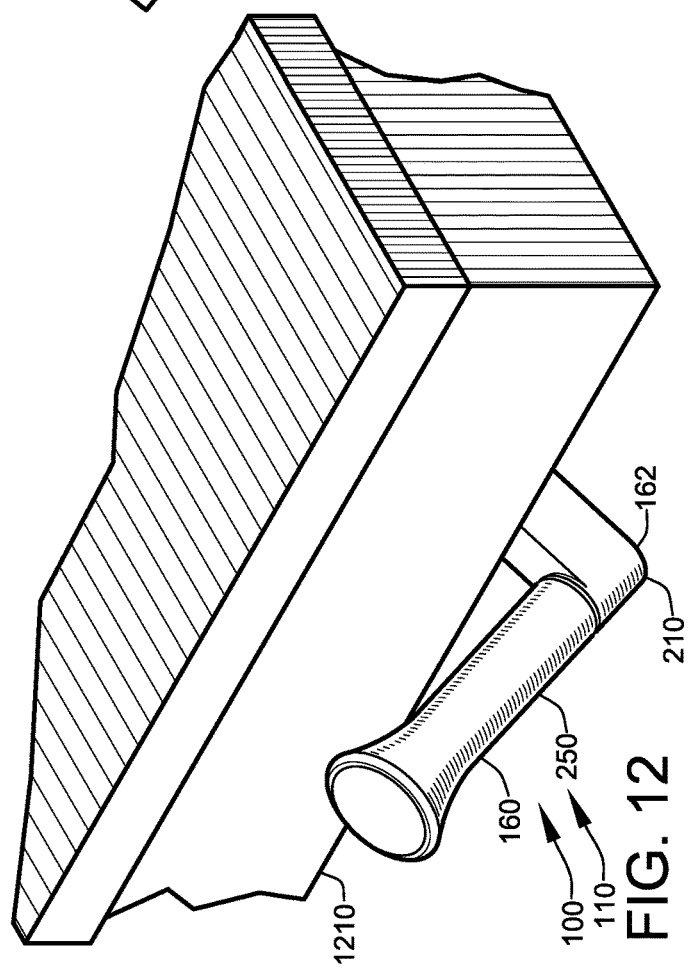
FIG. 12 shows a perspective view of the flag-mount bracket in use, mounted under the eaves of a structure, according to an alternately preferred embodiment of the present invention.
Figure 14:
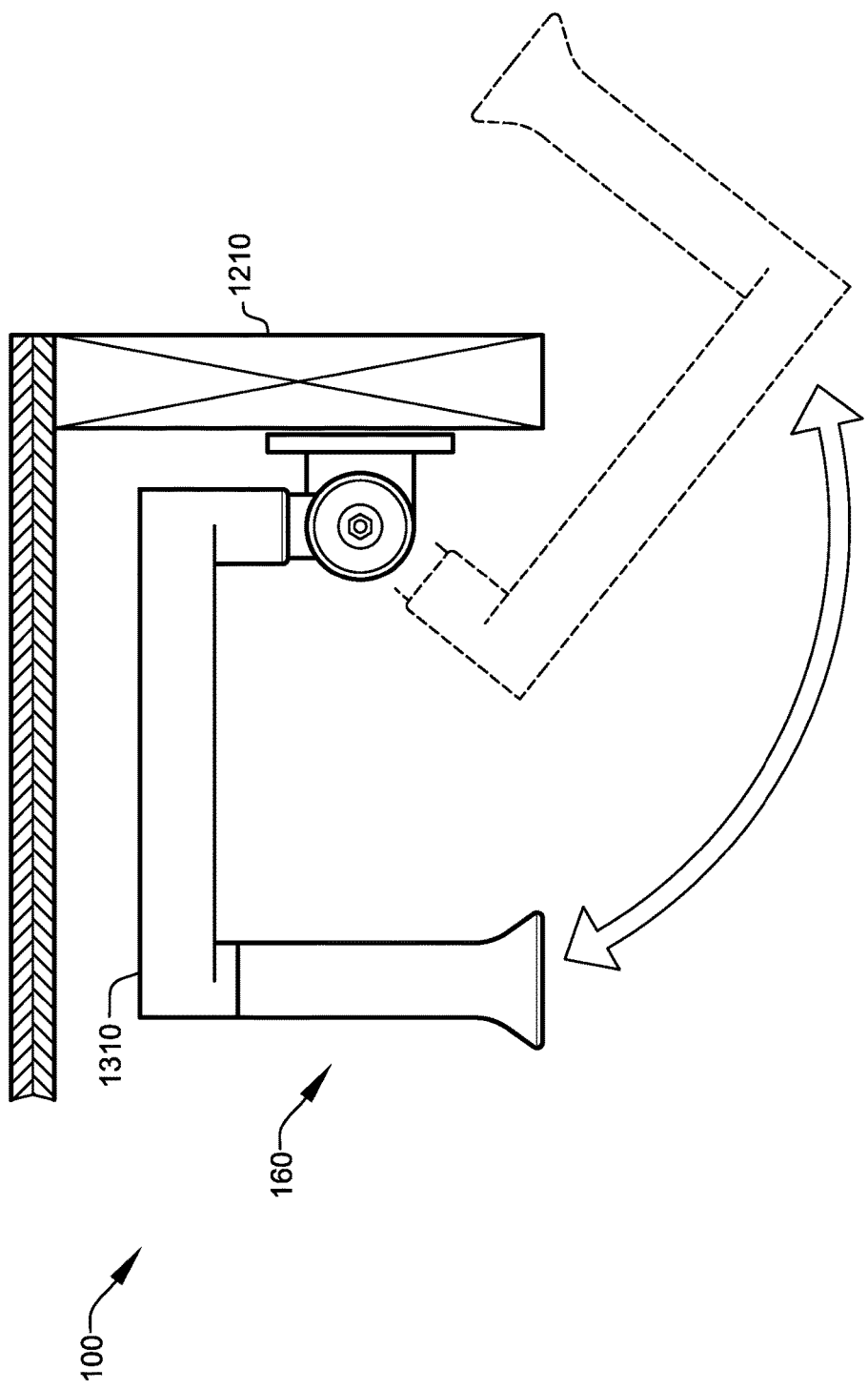
FIG. 14 shows a side view of the flag-mount bracket, according to the preferred embodiment of FIG. 13.

FIG. 12 shows a perspective view of the flag-mount bracket 110 of flag-mount bracket system 100 in use, mounted under the eaves 1210 (at least embodying herein at least one eaves-retractor structured and arranged to retract said at least one flag-pole receiver under at least one roof eaves when in such lowered position; and at least herein embodying wherein said at least one flag-pole receiver comprises at least one under-eaves configuration structured and arranged to retract under eaves of a roof when rotated down; and at least embodying herein eaves-retractor means for retracting said flag-pole receiver means under at least one roof eaves when in such lowered position) of a structure, according to an alternately preferred embodiment of the present invention. FIG. 13 shows a side view of the flag-mount bracket 1310 in use, illustrating flag-receiver arm 160 with an extended static-section 1320, according to the preferred embodiment of FIG. 12. FIG. 14 shows a side view of the flag-mount bracket illustrating flag-mount bracket system in an out of use position and how flag-mount bracket 1310 rotates to "swing" around the eaves 1210 of the structure, according to the preferred embodiment of FIG. 13.

Flag-mount bracket 1310 preferably comprises an extended static-section 1320 structured and arranged to allow flag-mount bracket 1310 to be mounted on the inside of the eaves 1210 of a structure and hidden from view, as shown. Extended static-section 1320 comprises squared U-shape. Upon reading the teachings of this specification, those skilled in the art will now appreciate that, under appropriate circumstances, considering such issues as user preference, manufacturing preference, materials, etc., other shapes, such as, for example, rounded U-shape, V shape, etc., may suffice. The extended U-shaped of static-section 1320 allows flag-receiver arm 160 to "swing" around the eaves 1210 of the structure when flag 107 is posted into it and raised by the user to a flying position. The present embodiment allows for flag-mount bracket 1310 to be hidden from view both in the raised and lowered positions behind the eaves 1210 of a structure, as shown.

Figure 15:
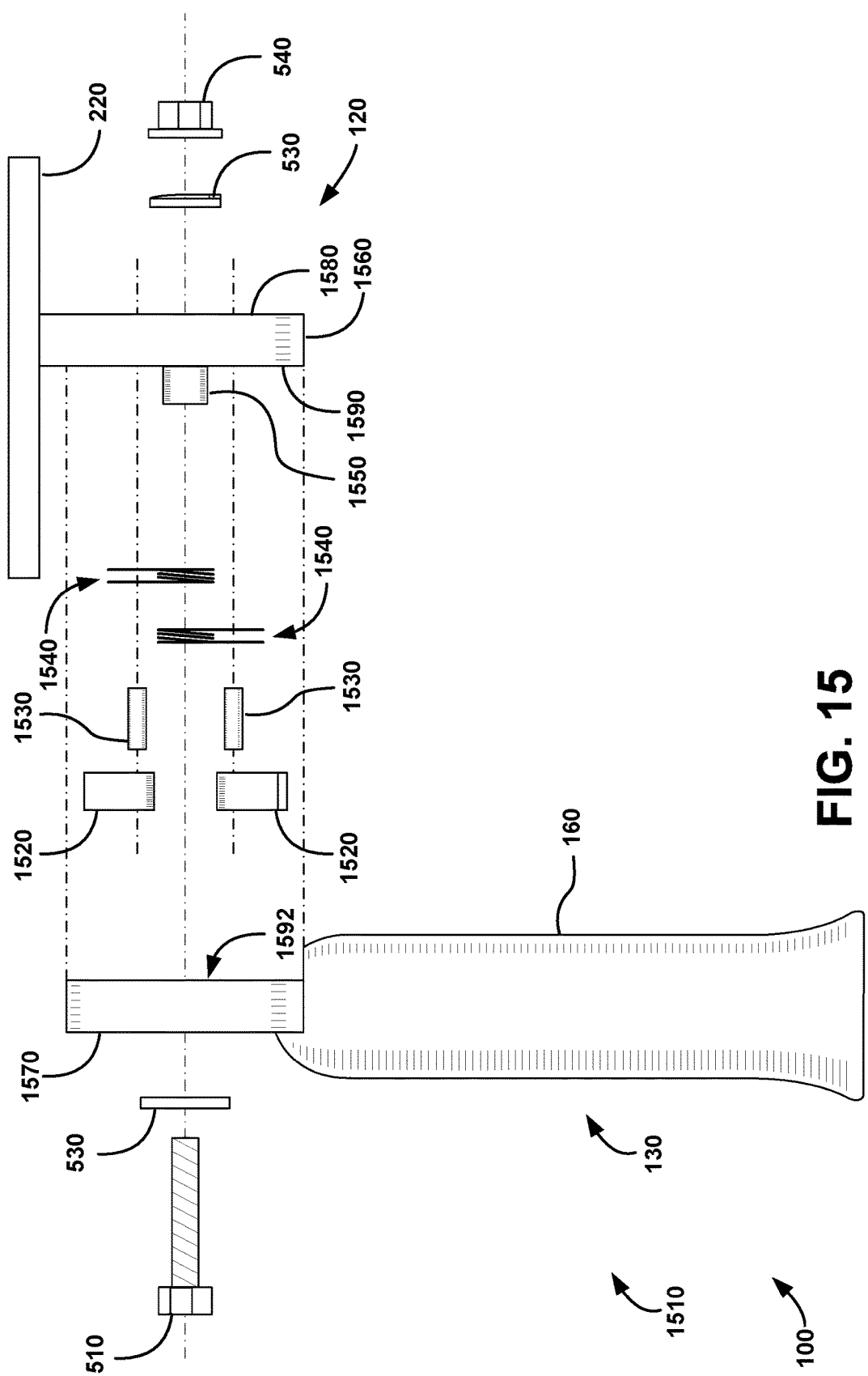
FIG. 15 shows an exploded side view of the flag-mount bracket of flag-mount bracket system, according to an alternately preferred embodiment of the present invention.
Figure 16:
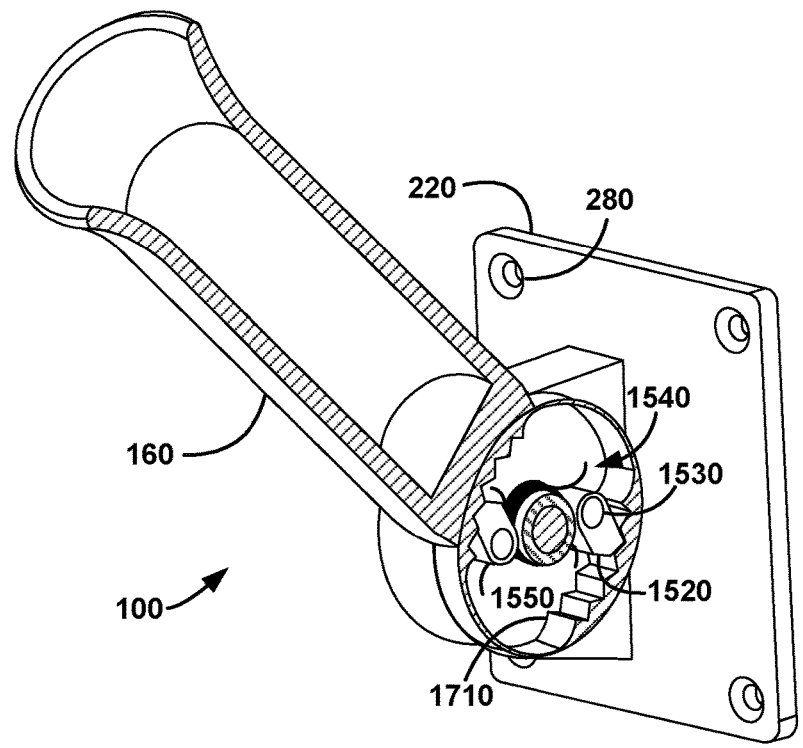
FIG. 16 shows a partial cutaway view of the flag-mount bracket, according to the preferred embodiment of FIG. 15.
Figure 17:
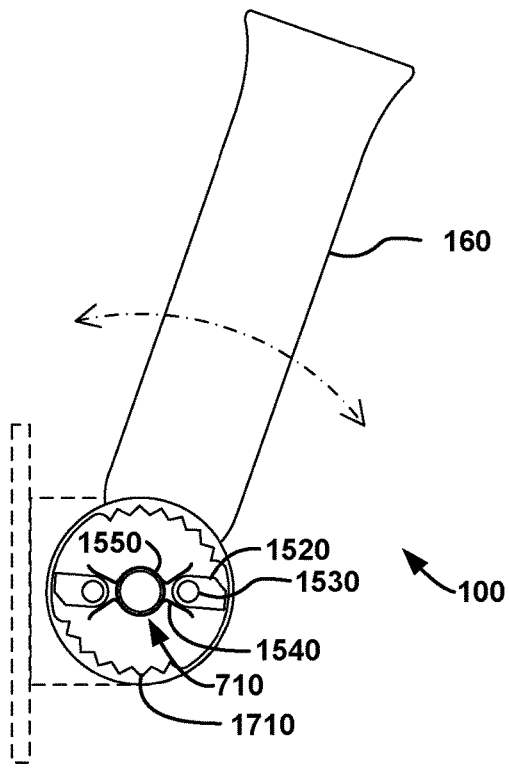
FIG. 17 shows a side view of the flag-arm portion in the "neutral" position, according to the preferred embodiment of FIG. 16.
Figure 18:
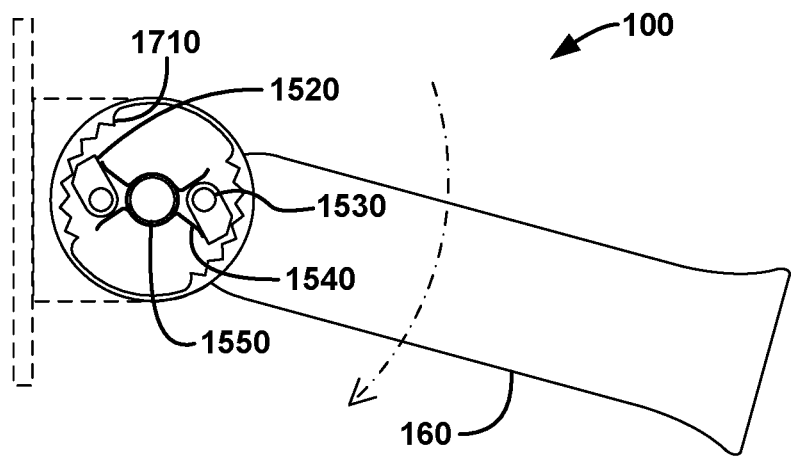
FIG. 18 shows a side view of the flag-arm portion in the "lowering" position, according to the preferred embodiment of FIG. 16.
Figure 19:
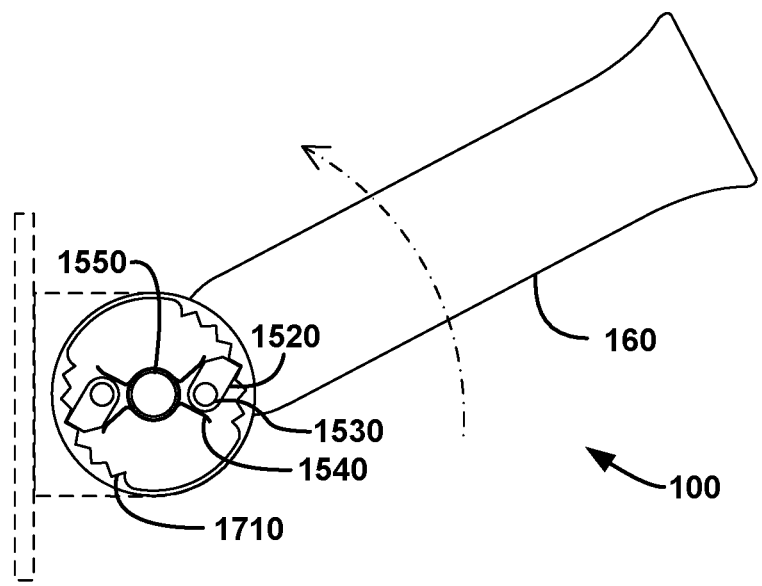
FIG. 19 shows a side view of the flag-arm portion in the "raising" position, according to the preferred embodiment of FIG. 16.
Figure 21:
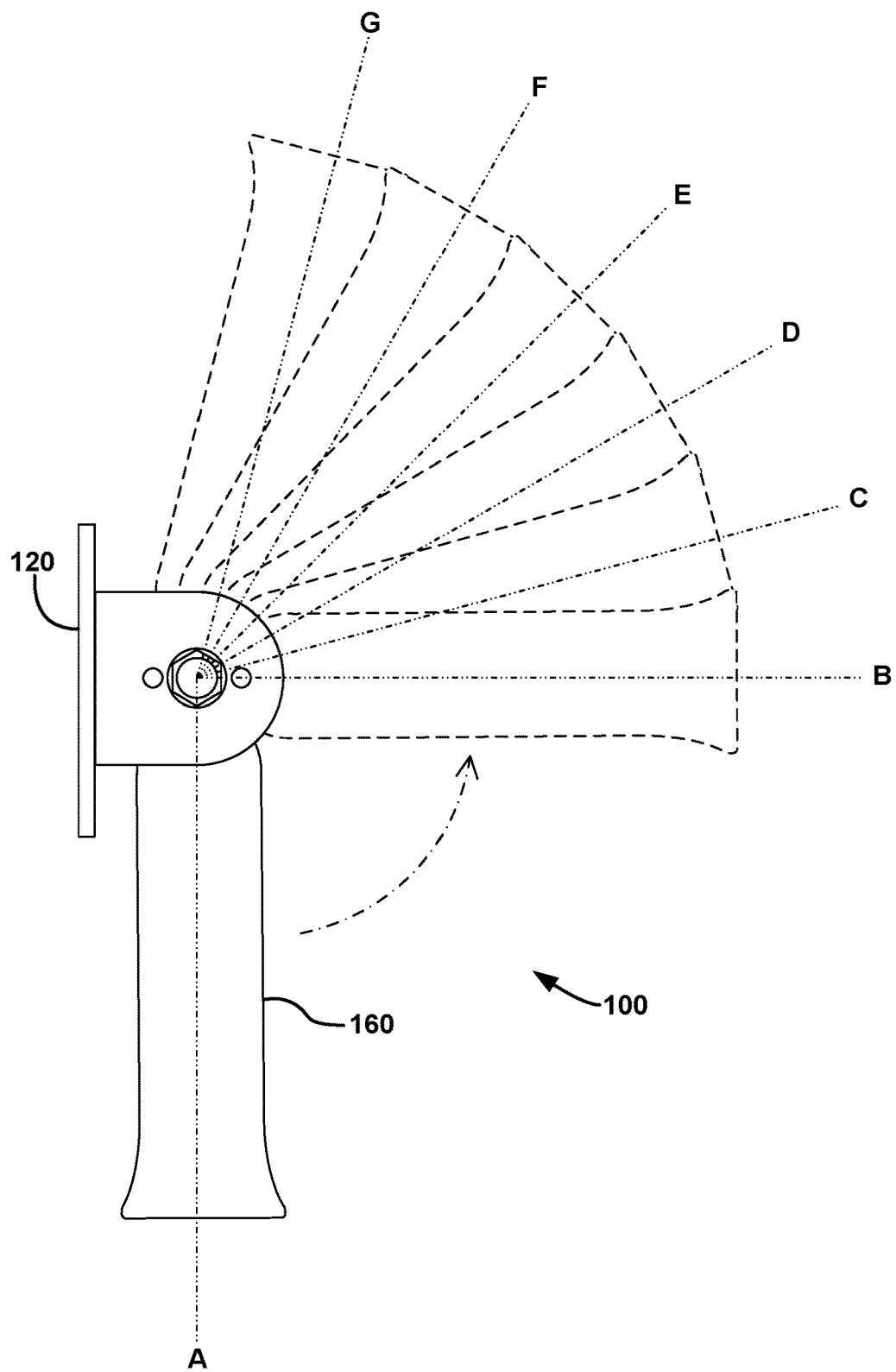
FIG. 21 shows a side view of the flag-mount bracket, illustrating the various different locked positions, according to the preferred embodiment of FIG. 16.

FIG. 15 shows an exploded side view of the flag-mount bracket 1510 of flag-mount bracket system 100, according to an alternately preferred embodiment of the present invention. FIG. 16 shows a partial cutaway view of the flag-mount bracket 1510, according to the preferred embodiment of FIG. 15. FIG. 17 shows a side view of the flag-arm portion 160 in the "neutral" position, according to the preferred embodiment of FIG. 16. FIG. 18 shows a side view of the flag-arm portion 160 in the "lowering" position, according to the preferred embodiment of FIG. 16. FIG. 19 shows a side view of the flag-arm portion 160 in the "raising" position, according to the preferred embodiment of FIG. 16. FIG. 20 shows a perspective view of flag-arm portion 160 of flag-mount bracket 110 depicting flag-securing stopper 2010 on the flag pole, according to a preferred embodiment of FIG. 15. FIG. 21 shows a side view of the flag-mount bracket, illustrating the various different locked positions, according to the preferred embodiment of FIG. 16.

FIG. 15 shows an exploded view of flag-mount bracket 1510 of flag-mount bracket 110. Many of the features of flag-mount bracket 1510 are repeated from flag-mount bracket 110, as shown. Flag-mount bracket 1510 preferably comprises at least one bracket-mount portion 120 and at least one flag-arm portion 130, as shown. However, the flag mount locking mechanism differs in flag-mount bracket 1510 from flag-mount bracket 110, as shown.

Bracket-mount portion 120 preferably comprises at least one bracket-mount-plate portion 220 and at least one flag-arm-attacher portion 1560, as shown. Flag-arm-attacher portion 1560 is attached to bracket-mount-plate portion 220 in the same manner described above, as shown.

Flag-arm-attacher portion 1560 preferably comprises outer face 1580 and inner face 1590, as shown. Both outer face 1580 and inner face 1590 of flag-arm-attacher portion comprise a flat surface. Flag-arm-attacher portion 1560 preferably comprises hole 710 extending through flag-arm-attacher portion 1560 from inner face 1590 to outer face 1580 (same hole 710 as in flag-arm-attacher portion 230 of bracket-mount mount portion 120 of flag-mount bracket 110) in the center of flag-arm-attacher portion 1560 (see FIG. 17). Flag-arm-attacher portion 1560 preferably further comprises at least one pawl-pin hole 1610 (not shown), at least two pawl-pin holes 1610 adjacent either side of hole 710 structured and arranged to allow pawl-pins 1530 (discussed below) to be secured into inner face 1590 of flag-arm-attacher portion 1560.

Flag-arm-attacher portion 1560 preferably further comprises at least one spring receiver 1550 structured and arranged to receive at least one pawl-spring 1540, preferably at least two pawl-springs 1540, as shown. Spring receiver preferably comprises cylindrical tube structured and arranged to accept pawl springs 1540 with an interior circumference which is equal to the circumference of hole 710, as shown. Flag-arm-attacher portion 1560 preferably further comprises at least one pawl-spring 1540, preferably at least two pawl-springs 1540 structured and arranged to assist locking flag-mount bracket 1510 at various stop-lock positions, as shown. Pawl-springs 1540 preferably comprise an internal circumference which is slightly larger than the exterior circumference of spring receiver 1550 allowing pawl-springs 1540 to slide over spring receiver 1550 (see FIG. 16). Pawl-springs 1540 are preferably mirror images of each other, such that they are coiled in opposite directions, as shown. Pawl-springs 1540 preferably comprise tails (or a length of wire which extends outside of the coil) both on the coil beginning side as well as the coil terminating side, as shown.

Flag-arm-attacher portion 1560 preferably comprises at least one pawl 1520 (at least herein embodying wherein said at least one rotation permitter comprises at least one position maintainer structured and arranged to maintain such at least one raised position until released, and at least one position releaser structured and arranged to release such at least one raised position and permitting lowering of said at least one flag-pole receiver to such lowered position; and at least embodying herein at least one position stop structured and arranged to stop and maintain said at least one coupler at at least one display position of the at least one flag; and at least herein embodying wherein said rotation permitter means comprises position maintainer means for maintaining such at least one raised position until released, and position releaser means for releasing such at least one raised position and permitting lowering of said flag-pole receiver means to such lowered position; and at least embodying herein at least one position release structured and arranged to release said at least one coupler maintained at such at least one display position and permit said at least one flag-pole receiver to rotate down to allow user retrieval of the at least one flag while the user is standing on the ground), preferably at least two pawls 1520 structured and arranged to engage ratchet teeth 1710 of bracket-attacher end 1570 of flag-arm portion 130 as discussed below (see FIG. 16). Pawl 1520 preferably comprises a shape. Preferably one end comprises a rounded edge to allow for pawl 1520 to easily rotate around pawl-pin 1530. Preferably the other end comprises one right-angled corner to allow pawl 1520 to "lock" into the ratchet teeth 1710 of bracket-attacher end 1570 during the raising function of flag-mount bracket 1510; and one beveled corner to allow pawl 1520 to "slide" over the ratchet teeth 1710 during the lowering function of flag-mount bracket 1510.

Flag-arm-attacher portion 1560 preferably further comprises at least one pawl-pin 1530, preferably at least two pawl-pins 1530 structured and arranged to secure pawls 1520 in a rotational manner to flag-arm-attacher portion 1560, as shown.

Bracket-attacher end 1570 of flag-arm portion 130 preferably comprises at least one shape, preferably circular shape structured and arranged to fit onto the circular end of flag-arm-attacher portion 1560 of bracket-mount portion 120. In the present embodiment of flag-mount bracket system 100, bracket-attacher end 1570 of bracket-mount portion 120 is preferably hollowed to form inner chamber 1592. Inner chamber 1592 is preferably structured and arranged to allow for a set of ratcheting teeth 1710 to be contained within bracket-attacher end 1570 (see FIG. 16).

Inner chamber 1592 preferably comprises at least one set of ratcheting teeth 1710, preferably at least two sets of ratcheting teeth 1710 structured and arranged to engage pawls 1520 of flag-arm-attacher portion to "lock" flag-mount bracket in place at a given stop-lock position. One set of ratcheting teeth 1710 is preferably located (within inner chamber 1592) directly behind bracket-attacher end 150 of flag-receiver arm 160, and the other set of ratcheting teeth 1710 is preferably located (within inner chamber 1592) directly on the other side of spring receiver 1550 (see FIG. 16). Inner chamber 1592 preferably comprises a smooth inner surface between each set of ratcheting teeth 1710 (see FIG. 17). When pawls 1520 located within these areas between the sets of ratcheting teeth 1710, flag-mount bracket 1510 is in the "neutral position", from which it can be either raised or lowered (see FIG. 17).

FIG. 18 illustrates flag mount-bracket 1510 in a "lowering position". In this position, pawls 1520 are preferably disengaged and rotated such that the beveled edge is facing the ratcheting teeth 1710 allowing them to slide over the ratcheting teeth 1710 as opposed to engaging them. Conversely, FIG. 19 illustrates flag-mount bracket 1510 in a "raising position". In this position, Pawls 1520 are preferably rotated such that the 90 degree angled corner is facing the ratcheting teeth. As the flag-mount bracket is pushed upward, the pawl will slide up each ratcheting tooth 1710, click over it and then engage or "lock" into the groove between ratcheting teeth 1710.

Each set of ratcheting teeth 1710 preferably comprise six sets of alternating teeth and grooves, creating six different stop-lock positions B-G (see FIG. 21). Stop-lock positions B-G are located in 15 degree increments. Position A is the "posting" position in which the flag-receiver arm is pointed directly downward at zero degrees.

FIG. 21 shows a side view of flag-mount bracket 1510 illustrating the various possible stop-lock positions. As discussed above, position A (at least herein embodying wherein such rotation comprises a lowered position of the at least one flag) comprises the "posting" or flag insertion position at zero degrees. Position B (at least herein embodying wherein said at least one connector comprises at least one rotation permitter structured and arranged to permit rotation of said at least one flag-pole receiver of at least 90 degrees; and at least herein embodying wherein said at least one coupler permits rotation of said at least one flag-pole receiver with respect to said at least one surface mount over at least a range of 90 degrees; and at least herein embodying wherein said connector means comprises rotation permitter means for permitting rotation of said flag-pole receiver of at least 90 degrees; and at least herein embodying wherein such rotation comprises a half-mast raised position of the at least one flag) comprises a horizontal position which is considered to be the "half-mast" position, located at 90 degrees from vertical. Position C and D are each located 15 degrees further toward vertical respectively from position B and each other. Position E (at least herein embodying wherein such rotation comprises a full-mast raised position of the at least one flag) comprises a 45 degree angle from horizontal (position B) and is considered to be the "full mast" position. Positions F and G are each located 15 degrees further toward vertical respectively from position E and each other.

Flag-mount bracket 1510 is preferably assembled in a similar manner as flag-mount bracket 110. Each pawl-pin 1530 is inserted into each pawl-pin hole 1610; and each pawl 1520 is attached to each pawl-pin 1530. Each pawl-spring 1540 is placed onto spring receiver 1550, one on top of the other in such a manner that each pawl-spring 1540 is coiled in the opposite direction of the other. Bolt 510 is preferably placed through washer 530, through bracket-attacher end 1570, through the hole in the center of spring-receiver 1550 and hole 710, through flag-arm-attacher portion and through another washer 530. Nut 540 is then tightened to secure the assembly together.

Figure 22:
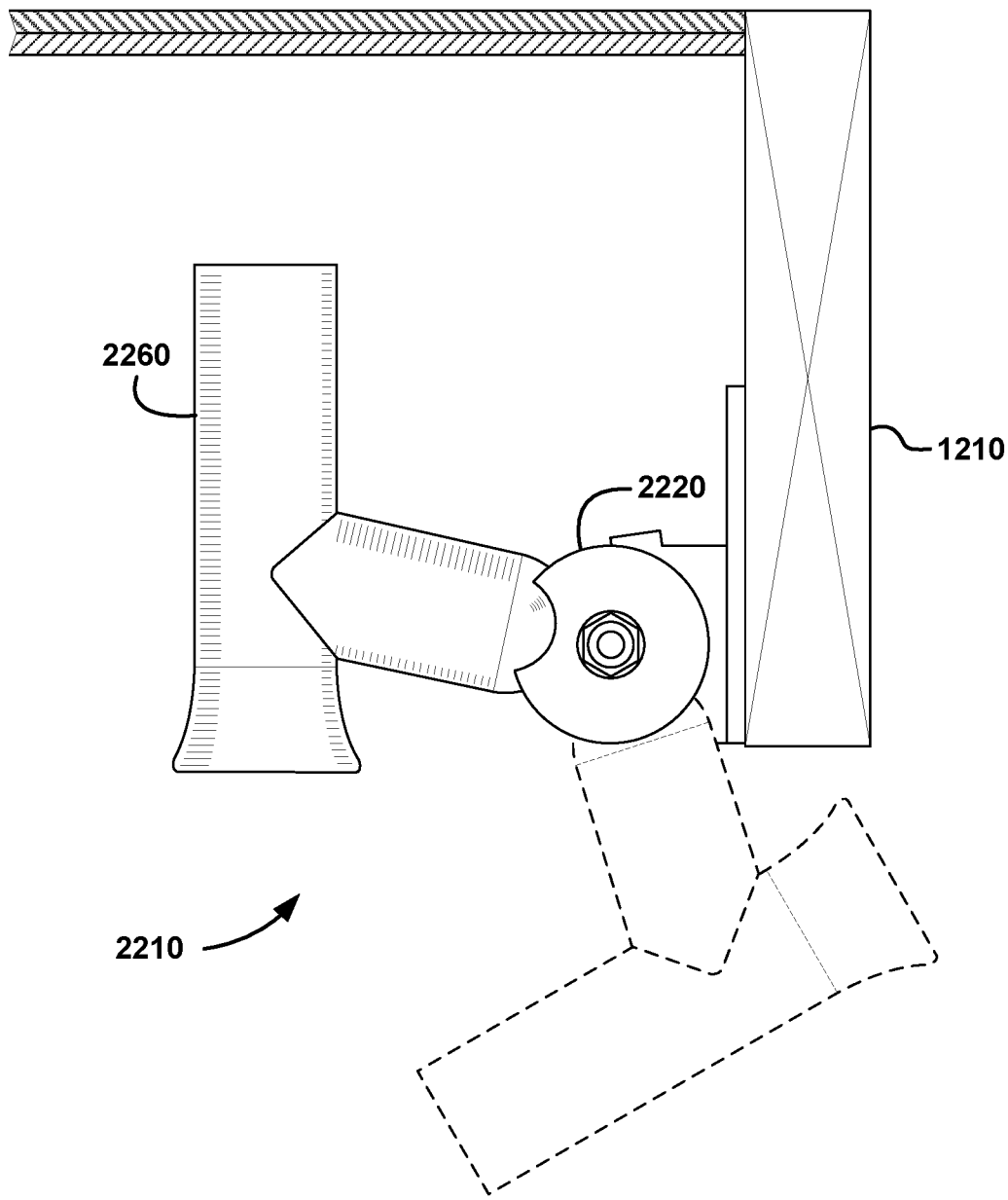
FIG. 22 shows the flag-arm portion in a "T" configuration, to allow flag-mount bracket to be mounted on the inside of the eaves of a structure, according to an alternately preferred embodiment of the present invention.

FIG. 22 shows the flag-arm portion 2260 in a configuration, to allow flag-mount bracket 2210 to be mounted on the inside of the eaves 1210 of a structure, according to an alternately preferred embodiment of the present invention. Flag-mount bracket 2210 preferably comprises bracket-mount portion 2220 and flag-arm portion 2260. Flag-arm portion 2260 preferably comprises cylindrical tube in a "T-shaped" configuration structured and arranged to allow flag-mount bracket 2210 to be hidden from view when not in use. When flag-mount bracket 2210 is in use, only flag 107 will be visible.

Although applicant has described applicant's preferred embodiments of this invention, it will be understood that the broadest scope of this invention includes modifications such as diverse shapes, sizes, and materials, as well as, non-conflicting combinations of features of various embodiments disclosed herein. Such scope is limited only by the below claims as read in connection with the above specification. Further, many other advantages of applicant's invention will be apparent to those skilled in the art from the above descriptions and the below claims.

What is claimed is:

1. A flag mount system, relating to a user's capability to post and retrieve at least one flag on at least one flag pole at a height greater than hand-reach of a user while standing upon the ground, comprising:
  a) at least one flag pole;
  b) at least one flag-pole receiver structured and arranged to receive posting of the at least one flag on said at least one flag pole;
  c) at least one surface mount structured and arranged to mount on at least one substantially vertical surface;
  d) at least one flag-pole retainer structured and arranged to retain at least one end of said at least one flag pole in said at least one flag-pole receiver until the user retrieves the at least one flag on said at least one flag pole; and
  e) at least one connector structured and arranged to connect said at least one flag-pole receiver and said at least one surface mount;
  f) wherein said at least one connector comprises at least one rotation permitter structured and arranged to permit vertical rotation of said at least one flag-pole receiver of at least 90 degrees;
  g) wherein said at least one rotation permitter comprises
    i) a full-mast raised position of said at least one flag-pole receiver,
    ii) a half-mast raised position of said at least one flag-pole receiver, and
    iii) a lowered position of said at least one flag-pole receiver;
  h) wherein said at least one rotation permitter permits rotation of said at least one flag-pole receiver from said lowered position through said half-mast raised position to said full-mast raised position;
  i) wherein said at least one rotation permitter further comprises
    i) at least one position maintainer structured and arranged to maintain said at least one raised position against rotation to said lowered position until released, and
    ii) at least one position releaser structured and arranged to release, through rotation beyond said full-mast raised position, said at least one raised position and permitting lowering of said at least one flag-pole receiver to said lowered position, iii) wherein said at least one position maintainer and said at least one position releaser are activated through only a rotationally applied force to said at least one flag-pole receiver.

2. The flag mount system according to claim 1 further comprising at least one flag-pole manipulator structured and arranged to permit user-manipulation of said at least one flag pole when said at least one flag pole is out of hand-reach of a user while user is standing on the ground.

3. The flag mount system according to claim 1 further comprising at least one flag-pole axial twister structured and arranged to axial twist the at least one flag pole preventing the at least one flag from wrapping around the at least one flag pole.

4. The flag mount system according to claim 1 further comprising at least one eaves-retractor structured and arranged to retract said at least one flag-pole receiver under at least one roof eaves when in such lowered position.

5. The flag mount system according to claim 1 wherein said at least one flag-pole retainer comprises at least one friction-fit retainer structured and arranged to retain said at least one flag pole in said at least one flag-pole receiver through friction.

6. The flag mount system according to claim 5 wherein said at least one friction-fit retainer mounts to said at least one flag pole.

7. The flag mount system according to claim 1 wherein said at least one flag-pole receiver further comprises at least one pole-end guide structured and arranged to guide at least one end of said at least one flag pole into alignment with said at least one flag-pole receiver.

8. The flag mount system according to claim 7 wherein said at least one pole-end guide comprises a funnel-shaped structure.

9. The flag mount system according to claim 7 wherein said at least one position maintainer maintains positions at about 15 degree intervals.

10. A flag mount system, relating to a user's capability to post and retrieve at least one flag on at least one flag pole at a height greater than hand-reach of a user while standing upon the ground, comprising:
    a) at least one flag pole;
    b) at least one flag-pole receiver structured and arranged to receive an end of said at least one flag pole at an upward angle;
    c) at least one surface mount structured and arranged to mount on at least one substantially vertical surface; and
    d) at least one coupler structured and arranged to couple said at least one flag-pole receiver to said at least one surface mount;
    e) wherein said at least one coupler permits vertical rotation of said at least one flag-pole receiver with respect to said at least one surface mount over at least a range of 90 degrees; and
    f) at least one position stop structured and arranged to stop and maintain against rotating down said at least one coupler at at least one display position of the at least one flag on said at least one flag pole; and
    g) at least one position releaser structured and arranged to release, through rotating said at least one flag-pole receiver above said at least one display position, said at least one coupler maintained at said at least one display position and permit said at least one flag-pole receiver to rotate down to allow user retrieval of the at least one flag on said at least one flag pole while the user is standing on the ground.

11. The flag mount system according to claim 10 further comprising at least one flag-pole hook-rod structured and arranged to permit user-manipulation of said at least one flag pole when said at least one flag pole is out of hand-reach of a user while user is standing on the ground.

12. The flag mount system according to claim 10 wherein said at least one flag-pole receiver comprises at least one under-eaves configuration structured and arranged to retract under eaves of a roof when rotated down.

13. The flag mount system according to claim 10 further comprising at least one friction grommet structured and arranged to fit on the end of said at least one flag pole and create a friction fit between said at least one flag-pole receiver and said at least one flag pole.

14. The flag mount system according to claim 10 wherein said at least one flag-pole receiver further comprises at least one funnel-end structured and arranged to guide the end of said at least one flag pole into said at least one flag-pole receiver.

15. The flag mount system according to claim 10 wherein said at least one position stop stops and maintains positions at about 15 degree intervals.

16. A flag mount system, relating to a user's capability to post and retrieve at least one flag on at least one flag pole at a height greater than hand-reach of a user while standing upon the ground, comprising:
    a) flag pole;
    b) flag-pole receiver means for receiving posting of the at least one flag on said flag pole;
    c) surface mount means for mounting on at least one substantially vertical surface;
    d) flag-pole retainer means for retaining at least one end of said flag pole in said flag-pole receiver means until retrieved; and
    e) connector means for connecting said flag-pole receiver means and said surface mount means;
    f) wherein said connector means comprises rotation permitter means for permitting vertical rotation of said flag-pole receiver of at least 90 degrees;
    g) wherein said rotation permitter means comprises
        i) a full-mast raised position of said flag-pole receiver means,
        ii) a half-mast raised position of said flag-pole receiver means, and
        iii) a lowered position of said flag-pole receiver means;
    h) wherein said rotation permitter means permits rotation of said flag-pole receiver means from said lowered position through said half-mast raised position to said full-mast raised position;
    i) wherein said rotation permitter means further comprises
        i) position maintainer means for maintaining said at least one raised position against rotation to said lowered position until released, and
        ii) position releaser means for releasing, through rotation beyond said full-mast raised position, said at least one raised position and permitting lowering of said flag-pole receiver means to said lowered position,
        iii) wherein said position maintainer means and said position releaser means are activated through only a rotationally applied force to said flag-pole receiver means.

17. The flag mount system according to claim 16 further comprising flag-pole manipulator means for user manipulation of said flag pole when said flag pole is out of hand-reach of a user while user is standing on the ground.

18. The flag mount system according to claim 16 further comprising flag-pole axial twister means for axial twisting the at least one flag pole preventing the at least one flag from wrapping around the at least one flag pole.

19. The flag mount system according to claim 16 further comprising eaves-retractor means for retracting said flag-pole receiver means under at least one roof eaves when in such lowered position.

20. The flag mount system according to claim 16 wherein said flag-pole receiver means further comprises pole-end guide means for guiding at least one end of said flag-pole into alignment with said flag-pole receiver means.

* * * * *